March 5, 1940.  G. R. CUNNINGTON  2,192,516
INSULATION SHEET MATERIAL
Filed May 28, 1937  2 Sheets-Sheet 1
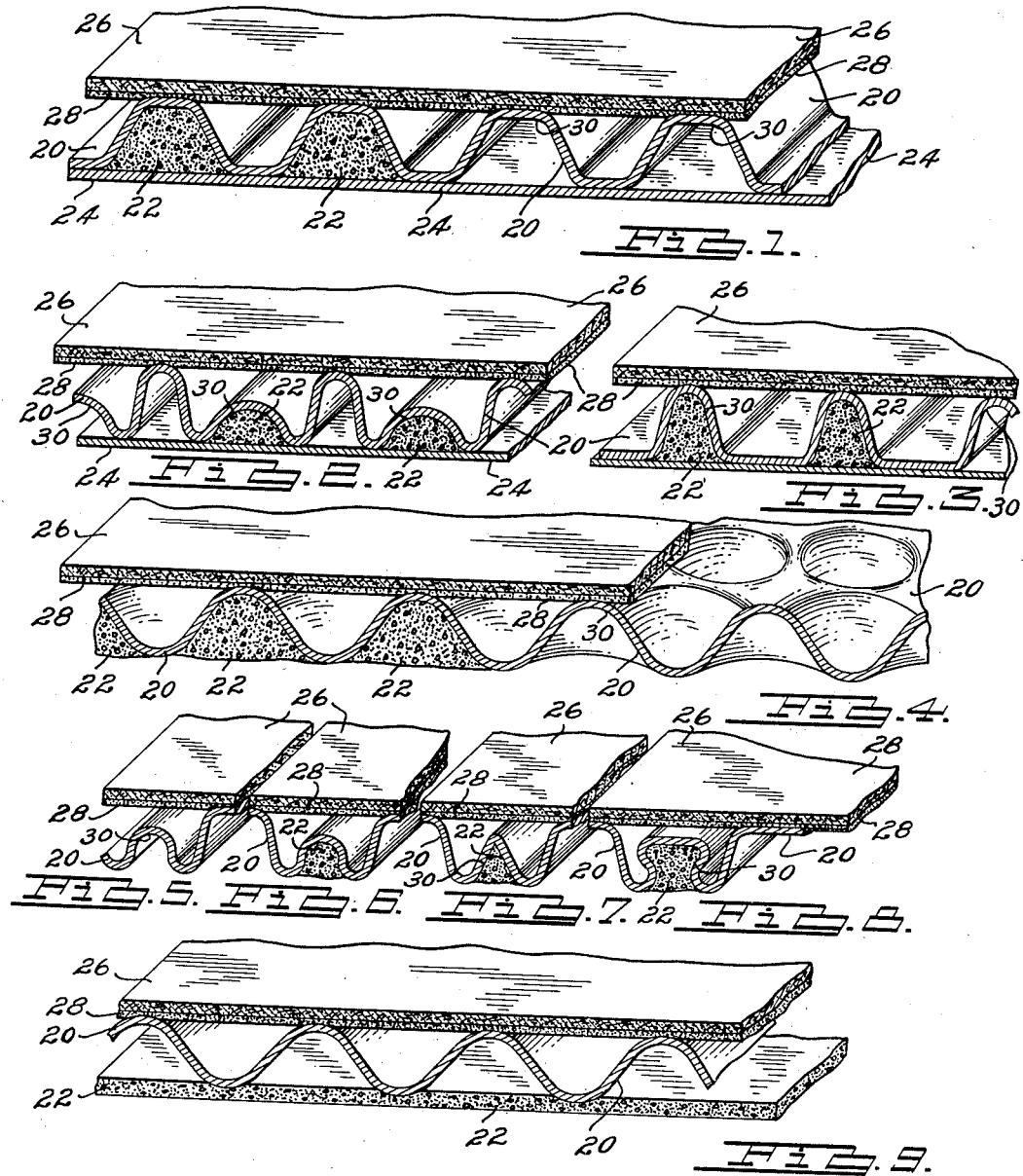
INVENTOR.
George R. Cunnington
BY
Parker & Burton
ATTORNEYS.

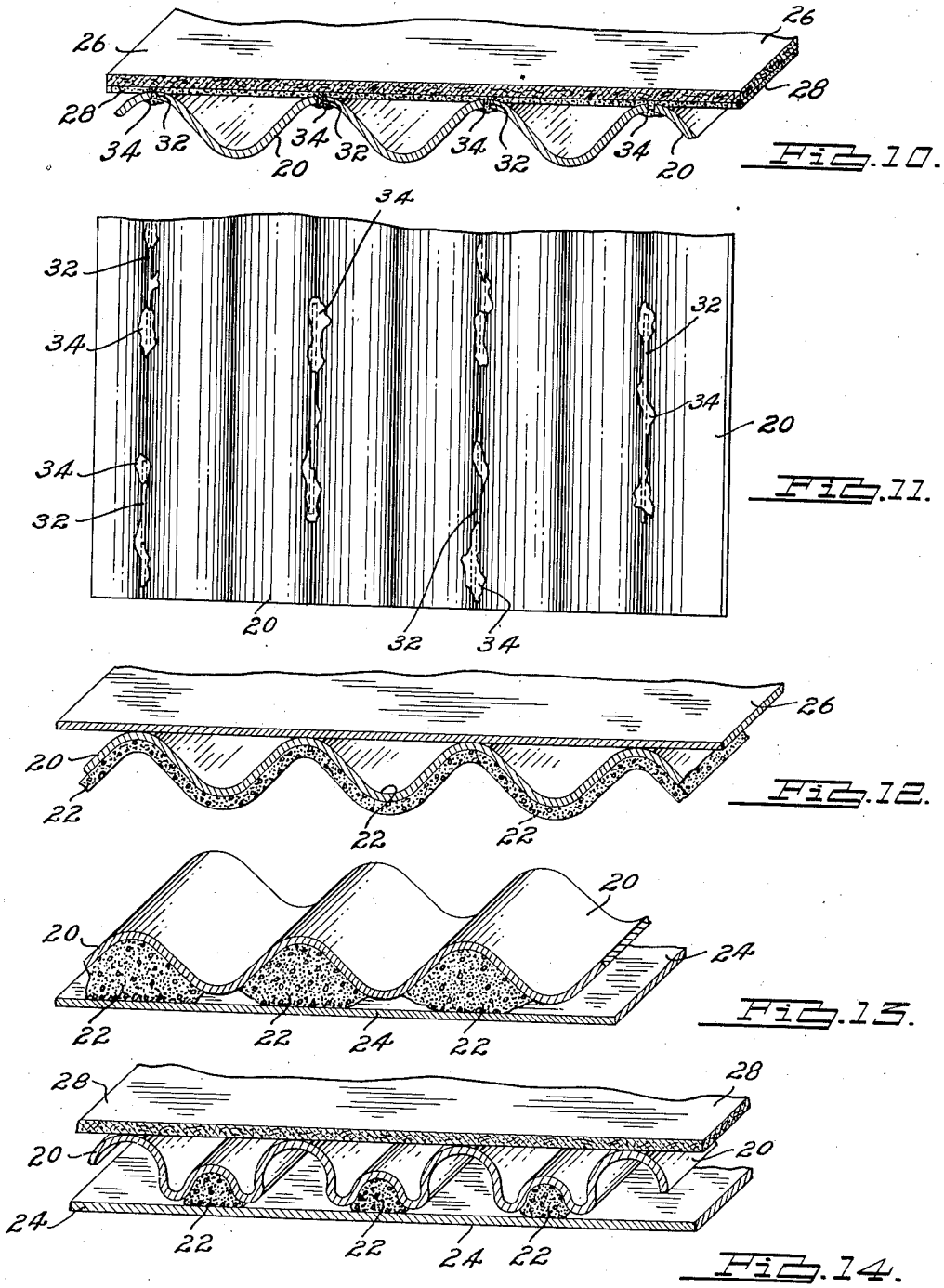

Patented Mar. 5, 1940

2,192,516

UNITED STATES PATENT OFFICE 2,192,516

INSULATION SHEET MATERIAL

George R. Cunnington, Detroit, Mich., assignor to Woodall Industries Incorporated, Detroit, Mich., a corporation of Michigan Application May 28, 1937, Serial No. 145,243

6 Claims. (Cl. 154—44)

This invention relates to an improved composite sheet of insulation material particularly adapted as an insulation for a metal sheet, and reference is made to my copending application relating to a similar structure, Serial No. 119,414, filed January 7, 1937.

An object is to provide a sheet of relatively light weight insulation material which may be readily adhesively secured to a supporting wall element such as a sheet metal wall and which possesses unusually effective qualities for dampening sound vibrations of the wall element to which it is adhered.

A further object is to provide a composite laminated sheet of sound deadening material which includes a sheet of corrugated paper and which is adapted under heat to adhesively secure itself to a metal or other wall element and serve as a sound dampening treatment for such wall.

In a preferred embodiment this structure comprises a lamination of corrugated material such as corrugated paper having the furrows between the ridges on one side filled with a plastic adhesive compound such as an adhesive asphaltic mastic. The furrows between the ridges on the opposite side of the sheet are preferably open and such side of the sheet may be provided with a covering layer or sheet of material extending thereover and secured to the ridges and bridging the furrows. Such sheet may be a layer of inert material such as asphalt saturated felt. The asphalt saturated felt layer is secured to the ridges bridging the open furrows.

Such sheet of asphalt saturated felt may be adhesively secured in place by an adhesive film which is interlocked through openings or slits in the crowns of the ridges which support the sheet.

An advantage of this treatment is that with it one is able to secure a corrugated sheet adhesively to a metal sheet the vibration of which it is desired to dampen by merely placing the corrugated sheet thereon with the asphalt mastic filled furrows juxtaposing the metal sheet and then subjecting the same to heat sufficient to cause the asphalt to adhere itself to the metal sheet.

The asphaltic mastic carried by the corrugated paper sheet may be arranged thereon other than as a mastic filler for the furrows between the ridges on one side of the sheet. Other such arrangements are shown herein. Such arrangements possess merit and permit of the employment as described of an insulation structure embodying a corrugated paper sheet.

In certain preferred embodiments the asphaltic mastic carried by the corrugated sheet overlies the metal sheet to which it is secured in spaced apart parallel ridges. It is held in such parallel ridges by the corrugated sheet. The corrugated sheet serves as a carrier for the asphaltic mastic. If plain asphalt were used instead of an asphaltic mastic of the character herein described the carrier would serve to prevent the asphalt from unduly spreading out over the surface of the metal sheet to which it is adhered and confine it in its adhesion thereto.

Preferably the plastic compound is an asphaltic mastic made up of loose filler particles such as reclaimed tire fibers or other structural particles as described in my copending application Serial No. 119,414, filed January 7, 1937, disposed at random throughout an asphaltic mass which asphaltic mass constitutes by weight about three times the amount of filler structural material.

This improved composite laminated sheet structure possesses superior sound deadening properties when adhered to a sheet of metal to that possessed by a layer of asphalt of the same weight or even a layer of asphalt of the same thickness. This improved composite laminated sheet is of course very much lighter in weight than a sheet of asphalt of the same thickness.

Other objects, advantages, and meritorious features of this invention will more fully appear from the following specification, appended claims, and accompanying drawings, wherein:

Figure 1 is a cross section through a perspective of a fragment of a structure embodying the invention showing the composite insulating sheet separate from the metal sheet, Figs. 2, 3, 4, 5, 6, 7, and 8 each illustrate a cross sectional view through a perspective of a fragment of a structure embodying the invention and wherein the corrugated board is slightly differently shaped in the structure shown in each figure, Fig. 9 is a cross section through a perspective of a fragment of a modified embodiment of the invention, Fig. 10 is a sectional perspective through a fragment of a structure illustrating one manner of securing a sheet to the ridge crowns of the corrugated sheet, Fig. 11 is a plan of the structure shown in Fig. 10 looking at the corrugated sheet side thereof, Fig. 12 is a section through a perspective of a modified form of construction, and Figs. 13 and 14 are sectional views through perspectives of fragments of structures embodying the invention showing the laminated insulating structure adhesively secured to a metal or other supporting sheet.

In the invention herein disclosed the asphaltic mastic material which is employed may very well be an asphaltic mastic of the character particularly described in my copending application Serial No. 119,414, hereinabove referred to. This is an asphaltic mastic wherein particles of structural filler material are mixed throughout an asphaltic mass in proportions which will assure an excess of asphalt and yet provide sufficient structural material to prevent the asphalt from flowing undesirably out of the mastic over the surface of the metal sheet to which a layer of the mastic is being adhered by heat.

The proportion of asphaltic material and the filler material may vary and will depend upon the character of the filler and the character of the asphalt and the heat conditions which will be present for adhesion but it has been found that the asphaltic binder should be present in a quantity equal to two or three times the filler material by weight to provide the best results. Various types of filler substances may also be used. It is desirable that these be of light weight so as to keep the weight of the composite insulation sheet down per area unit. Reclaimed tire fibers and oat hulls are mentioned in my application Serial No. 119,414 above referred to. Other structural products which might be used are the rough springy fibers of shredded corn stalks, peanut shells as well as husks of other products, charcoal, sawdust, cinders, et cetera. Preferably the structural filler should be relatively non-absorbent and add body to the mass.

In the instant application I make use of a corrugated material such as corrugated paper which is associated with the asphaltic mastic in such a way that the corrugated paper acts as a carrier for the mastic and the mastic serves to unite the corrugated paper adhesively to a supporting structure such as a metal wall. The corrugated paper and mastic is made up in sheet form as shown with the corrugated paper serving as a carrier for the mastic. Additional sheet material may be advantageously associated therewith to the ultimate benefit of the insulation treatment.

Throughout the several figures of the drawings the corrugated paper sheet or lamination is indicated as 20 and the asphaltic mastic as 22. The metal sheet to which my composite insulation material is or may be adhesively secured is indicated as 24.

In Fig. 1 the corrugated paper has the furrows on one side between the ridges on such side filled with the mastic 22. The furrows between the ridges on the opposite side of the sheet are vacant. These vacant furrows however are covered with a sheet of protective material which may be a sheet of paper, cardboard or saturated felt. Asphalt saturated felt which is relatively inert has been found suitable. Such sheet is indicated as 26. This saturated felt sheet may be secured to the crowns of the ridges by adhesive 28.

In Fig. 1 the parts are relatively exaggerated in size and the adhesive 28 is shown as a film of adhesive spread over the sheet 26. This sheet 26 with the adhesive layer is then placed upon the ridges and pressed thereagainst to obtain secure adhesion. It would not be necessary to have the adhesive layer extend over the entire surface of the sheet 26. It might be applied merely to the crowns of the ridges.

In Figs. 2 and 3 the structure differs merely in the fact that in Fig. 3 the furrows between the ridges which are filled with the asphaltic mastic are relatively narrow and deep furrows. This leaves relatively wide vacant furrows on the opposite side of the sheet. In Fig. 2 each ridge on one side of the sheet has a relatively wide face or crown and is provided with a channel or groove 30 in the crown of the ridge. The asphaltic mastic 22 is disposed within this channel or groove 30 in the crown of the ridge. The furrows between the ridges are not in the structures of Figs. 2, 6, 7, and 8 filled with the mastic but only a relatively small amount of mastic is employed and this mastic is located entirely within the grooves 30 in the ridges as shown.

Fig. 4 illustrates a sheet which is pebbled instead of corrugated with ridges. The pebbled character provides cavities or craters which correspond to the furrows of Fig. 3 and are similarly filled with the mastic.

Figs. 5, 6, 7 and 8 illustrate modifications of the shape of groove 30 as shown in Fig. 2. In each of these structures the ridge is provided with a groove or the like 30 which is filled with a mastic. Instead of a continuous groove or channel there might be a succession of cavities or depressions arranged linearly along the ridge crowns. The mastic in this case serves the purpose of securing the corrugated sheet to the metal sheet with the minimum amount of asphaltic mastic material. It loads the paper at intervals with the inert plastic and changes its acoustic characteristics. When it is adhered to the metal sheet the response of the sheet to sound transmission is materially altered. In Fig. 8 this channel 30 is so formed that the mastic is locked in position therein.

In Fig. 4 the corrugated board is a board which is not strictly corrugated in the sense of having a plurality of parallel ridges but is more of what might be termed a pebbled construction. The board is bent at intervals in opposite directions forming a plurality of closely spaced cavities or depressions alternating with hills or protuberances. In this construction the cavities on one side of the board are filled with the mastic while on the opposite side such cavities are empty. The board is indicated as 20 and the mastic as 22 as hereinabove described and there is a sheet of asphalt saturated felt 26 or the like secured by adhesive 28 to the side of the pebbled board over the vacant cavities.

In Fig. 9 a corrugated sheet 20 is provided on one side with a layer 26 secured thereto by the adhesive 28 as hereinabove described. On the opposite side instead of having the furrows filled with the asphaltic mastic such asphaltic mastic is made up into sheet form being indicated by the numeral 22 and in such sheet form it is secured to that side of the corrugated board opposite sheet 26. It is adhesively secured to the corrugated board. It will function as will the mastic in the furrows between the ridges of the corrugated board or in the grooves 30 to hold the corrugated material to a metal sheet to which the mastic is adhered.

Figs. 10 and 11 illustrate an improved means for securing a sheet such as 26 to the crowns of the ridges of the corrugated material 20. In this construction the corrugated sheet 20 is provided with openings which may be in the form of slits 32 through the crowns of the corrugations. These slits may be spaced apart. They are relatively narrow. They might be merely a plurality of spaced apart apertures. The adhesive 28 which may be asphalt flows through these slits and securely bonds the sheet 26 to the corrugated sheet. Upon flowing through the slits it interlocks on the opposite side flowing over the corrugated sheet as shown in Fig. 11 at 34 and in Fig. 10 at 34.

In Fig. 12 the corrugated sheet 20 has asphaltic mastic secured to one side thereof and extending as a layer thereover instead of being deposited merely within the furrows as is the case in Fig. 1. A sheet 26 may be secured to the opposite side of the corrugated sheet by a thin layer of adhesive spread merely on top of the crown of the ridges.

This asphaltic mastic when subjected to heat required to produce adhesion has the capacity of expanding in response to such heat as is more particularly described in my copending application hereinabove cited. When the composite insulation sheet made up of the corrugated material in the asphaltic mastic is placed upon a sheet of metal such as 24 as shown in Figs. 13 and 14 the mastic expands in thickness as well as adheres to the metal sheet and this expansion or blowing may amount to 60% in thickness. During the heat application the asphalt spews onto the metal sheet and adheres firmly therewith.

With the mastic deposited merely in the furrows or in the grooves in the ridges and the composite sheet secured to a metal sheet the mastic is arranged upon the metal sheet in a succession of spaced ridges and held to such ridge formation by the corrugated material. The corrugated material acts as a carrier for the mastic. It also provides in the composite sheet dead air spaces intervening the ridges of mastic. The asphalt saturated felt layer provides a layer of a different density than the sheet of corrugated material or the asphaltic mastic layer. The composite sheet therefore includes three laminations, if the mastic is considered a lamination, which vary in density and includes air spaces provided by the corrugated sheet. Such composite sheet is of light weight in proportion to its mass and the corrugated lamination, by virtue of acting as a carrier for the mastic, dispose the mastic in masses separated by air spaces and serves to provide a structure of exceedingly light weight for its mass and of a relatively inert character but because of the presence of the corrugated lamination the composite sheet is relatively stiff.

What I claim:

1. A laminated structure comprising a vibratile metal sheet, a lamination of corrugated fibrous material overlying one surface of the metal sheet, said corrugated lamination comprising alternating grooves and ridges wherein the ridges have cavities formed in the crowns thereof, and segregated sound damping masses of thermoplastic mastic material disposed in said cavities whereby adhesively securing the corrugated lamination to the metal sheet, said corrugated lamination being otherwise disconnected from the metal sheet and free of thermoplastic material.

2. A laminated structure comprising a vibratile metal sheet, a relatively stiff corrugated fibrous sheet overlying one surface thereof, relatively inert sound damping thermoplastic material disposed only within the grooves of the corrugated sheet on the side adjacent to the metal sheet adhesively securing such corrugated sheet to the metal sheet only through such spaced apart groove portions of the corrugated sheet.

3. A laminated structure comprising a vibratile metal sheet, a sound damping multi-ply lamination comprising a layer of fibrous material and a layer of sound damping thermoplastic material jointly formed into a corrugated sheet and secured only at spaced intervals by the thermoplastic material to the metal sheet.

4. A laminated structure comprising a vibratile metal sheet and a sound damping multi-ply lamination overlying one surface thereof, said multi-ply lamination comprising in part a layer of fibrous sheet material and in part sound deadening thermoplastic material and being so formed that it overlies the metal sheet with the thermoplastic material directly contacting the metal sheet only at spaced intervals throughout the opposed area of the metal sheet said multi-ply lamination being secured to the metal sheet at such spaced intervals of contact only and by the thermoplastic material.

5. A laminated structure comprising a vibratile metal sheet, a sound damping layer overlying one surface of the metal sheet and comprising a lamination of fibrous material provided upon the surface adjacent to the metal sheet with spaced apart relatively small indentations and with inert sound dampening asphaltic material disposed within said indentations and adhesively securing the fibrous sheet to the metal sheet, said fibrous sheet being otherwise disconnected from the metal sheet.

6. A laminated structure comprising a vibratile metal sheet, a sound damping layer overlying one surface of the metal sheet and comprising a lamination of fibrous material provided on the surface adjacent to the metal sheet with spaced apart relatively small localized areas of inert sound damping asphaltic material adhesively securing the fiber sheet to the metal sheet throughout such localized areas, said fibrous sheet being otherwise disconnected from the metal sheet, said small localized area of asphaltic material being relatively thick and weighting the metal sheet at such points of adhesion, said fiber sheet being bent to embrace and confine said asphaltic material within said localized area.

GEORGE R. CUNNINGTON.